Patented May 6, 1930

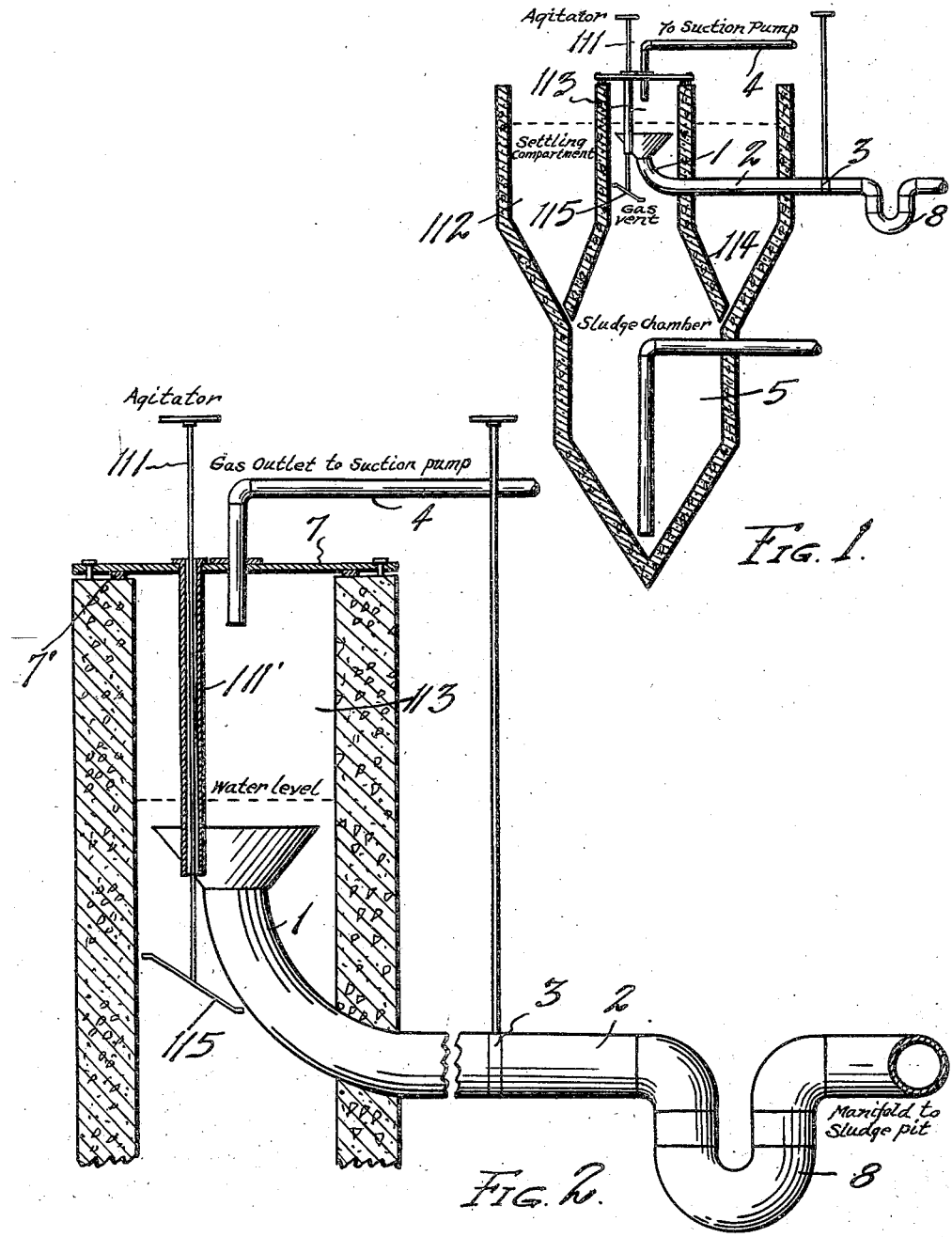

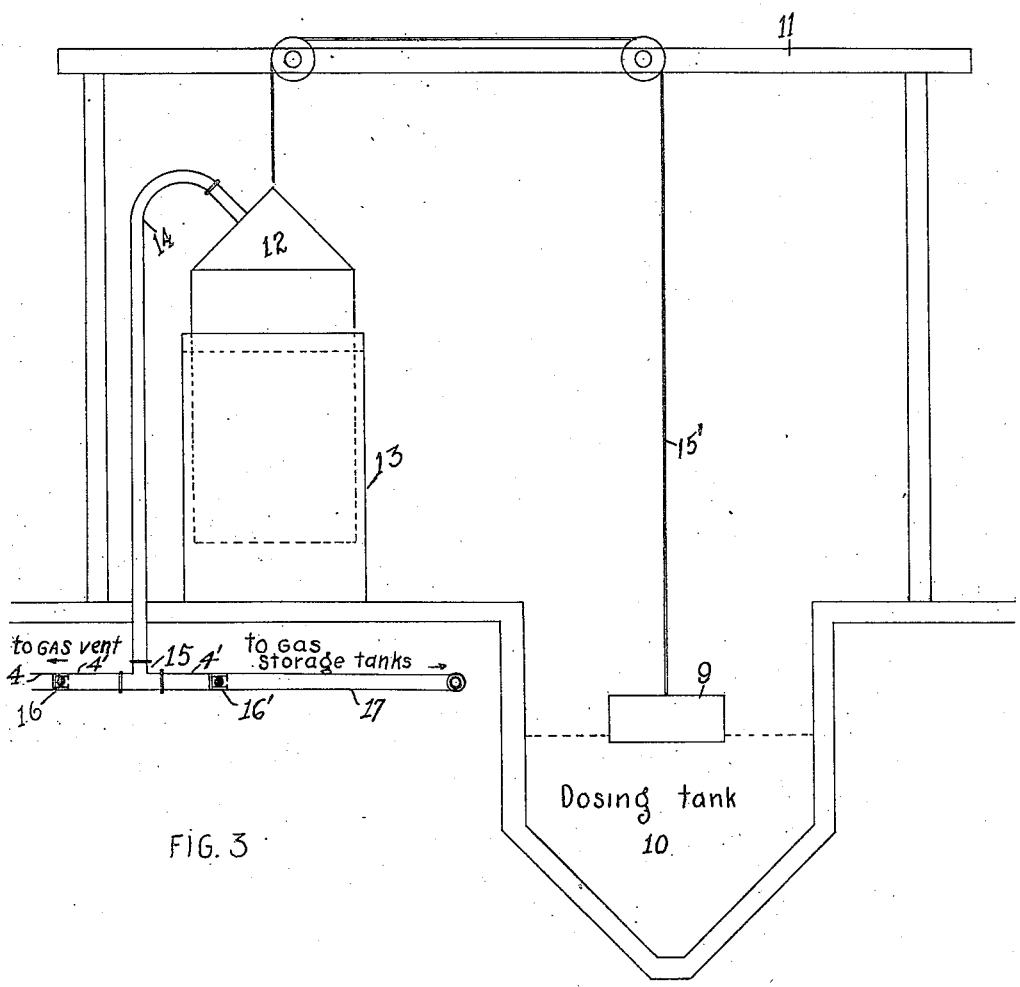

1,757,262

UNITED STATES PATENT OFFICE

THOMAS BANKS SIMS, OF CLEBURNE, TEXAS, ASSIGNOR TO L. J. WARDLAW, OF TARRANT COUNTY, TEXAS

SEWAGE-DISPOSAL PLANT

Application filed April 23, 1928. Serial No. 272,342.

This invention relates to new and useful improvements in sewage disposal plants.

One object of the invention is to operate a disposal plant under a vacuum, whereby increased sedimentation is obtained. By creating a vacuum in the purification tank the gases are pulled through the scum and constantly carried off, thus preventing their escape in the path of the influent. This not only relieves gas pressure in the tank, but prevents interference with the influent and the sedimentation of particles. It is important that the scum be periodically removed so as to afford a maximum flow of gas which is induced by the constant vacuum. It is obvious that increased sedimentation will increase the capacity of the plant.

A further object of the invention is to degas the water whereby the water more readily takes on oxygen, is stabilized and prevented from fouling. By de-gassing the water and thus getting rid of the gases, it is not necessary to maintain as large a spray bed as is usual in the ordinary plant.

Another object of the invention is to draw off the gases and utilize the same as fuel or for other purposes, thereby not only getting rid of the gas but odors as well.

A still further object of the invention is to automatically maintain and create a vacuum in the scum chamber of the disposal plant by means of a pump set in operation by a float operating in the dosing tank, whereby the fluxation of the level of the liquid in the dosing tank operates the pump, thus creating and maintaining the vacuum substantially without cost.

Still another object of the invention is to simplify the operation of the plant as well as the labor involved and to lower both the maintenance and operating cost.

A construction designed to carry out the invention will be hereinafter described, together with other features of the invention.

The invention will be more readily understood from a reading of the following specification and by reference to the accompanying drawings, in which an example of the invention is shown, and wherein:

Fig. 1 is a sectional view of a purification tank constructed in accordance with the invention;

Fig. 2 is an enlarged sectional view showing the scum chamber and component parts, and Fig. 3 is an elevation of the dosing tank and pump.

In the drawings the numeral 5 designates the sludge chamber of the purification tank which has settling compartments 112 on each side of a central scum chamber 113. Septums diverge from each side of the lower end of the scum chamber and separate the settling compartments from the sludge chamber.

A drain elbow 1 having a flared or funnel top is disposed in the chamber 113 and extends through the wall thereof. This elbow is connected with a pipe 2 which extends through the wall of the tank and includes a valve 3, which is placed in advance of a trap 8. The elbow 1 is below the water level and light sludge and scum, as well as water, is carried off through the pipe 2 to the sludge pit, as is well understood. The trap 8 acts as a seal to prevent the passage of gas from the tank to the sludge pit.

A cover plate 7 is secured on top of the scum chamber 113 and rests upon gaskets 7', so as to form an air-tight joint. By this means a gas chamber is formed above the scum in the scum chamber. A suction pipe 4 extends through the cover 7 and is connected with a suitable suction pump, whereby the gas is extracted from the scum chamber. The pipe 4 may be connected with a pumping device, such as is shown in my co-pending application filed August 13, 1928, Serial No. 299,276.

As it is desirable to break up the scum formations so as to promote the flow of gas, I provide agitators 111 extending through packing tubes 111' suspended from the cover 7. Each agitator has a beater 115 on its lower end and is vertically adjustable so as to be raised and lowered as it is rotated to break up the scum.

In operating the plant the sewage or other liquid to be purified is suitably introduced into the settling compartments 113 and the sludge in the usual manner settles to the chamber 5. A liquid level is maintained above the funnel of the elbow 1 and the lighter and clearer liquids will rise in the chamber 113.

The gas from the sludge chamber seeking an escape will pass upward and accumulate in the gas chamber above the liquid level in the scum chamber 113. This operation will form a scum on the top of the water in the chamber 113. By periodically opening the valve 3, light sludge and scum will be carried off through the elbow 1 and the pipe 2. This prevents the scum from becoming so dense in the chamber 113 as to interfere with the free passage of the gas.

The important feature is the creation of a vacuum in the upper portion of the chamber 113 whereby the gas is carried off from the gas chamber. The creation of the vacuum pulls the gas and sets up a rapid flow. It is not merely desired to obtain gas for fuel purposes but to promote a flow of the gas whereby it is removed from the tank and whereby the water is de-gassed.

It is obvious that the pipe 4 may be connected to any kind of a suction pump. As an economical means the pipe may be connected with the pump shown in Fig. 3 of this application or in the drawings of my co-pending application as hereinbefore referred to. In connection with Fig. 3 the dosing tank is indicated by the numeral 10 and a float 9 is provided in this tank. The liquid level is constantly changing in this tank which causes the float to ascend and descend. The pipe 4 is connected with a pipe 4', which includes a check valve 16. The pipe 4' enters a T 15 which is connected with a hose 14 having its upper end connected with the dome 12 of the container 13.

The dome 12 is attached to one end of a flexible connection 15' carried by an overhead support 11 equipped with suitable pulleys. The opposite end of the connection is attached to the float 9. The float 9 is heavy enough to elevate the dome 12 when the liquid level is lowered in the tank 10. The lower end of the dome is constantly immersed in water in the container 13 thus being provided with an air chamber in its upper portion.

When the dome 12 is elevated a suction is created therein whereby gas is drawn from the pipe 4, past the check valve 16, through the pipe 4', T 15 and hose 14. When the dome descends by the raising of the float the gas contained therein is compressed and expelled through the hose 14, whereby the check valve 16 is closed. However, the pressure opens a check valve 16' in a discharge pipe 17 which is connected to the T 15, whereby the compressed gas is conveyed to suitable storage. This pumping plan will operate with sufficient rapidity and force to create and maintain a vacuum in the chamber 13.

By extracting the gases and maintaining a partial vacuum in the gas chamber, gases are prevented from passing from the sludge chamber into the settling compartments and resisting the settling operation. This allows more complete sedimentation and increases capacity. The operation of the vacuum causes a more complete extraction of the gases, thereby producing an effluent absorbing more oxygen which increases the stability of said effluent. It is pointed out that the light sludge being carried off through the pipe 2 is disposed of separately from the heavy sludge, which is removed in the usual way from the chamber 5. This is of great advantage and makes for economy in labor and cost of operation and maintenance.

This application is filed as a continuation in part of my former application Serial No. 261,142, filed March 12, 1928.

What I claim, is:

1. The method of treating sewage and impure liquids which comprises settling the heavier sludge in a sludge chamber, flowing the lighter sludge and scum upward to a separate chamber sealed against admission of air, and creating a vacuum in the separate chamber effective upon the liquid therein, whereby gases are induced to flow upward from the sludge chamber into the separate chamber, thus being deflected from the path of the influent and whereby sedimentation is increased.

2. The method of treating sewage and impure liquids which comprises settling the heavier sludge in a sludge chamber, flowing the lighter sludge and scum upward to a separate chamber sealed against admission of air, creating a vacuum in the separate chamber effective upon the liquid therein, whereby gases are induced to flow upward from the sludge chamber into the separate chamber, thus being deflected from the path of the influent and whereby sedimentation is increased, and removing the light sludge and scum from the separate chamber to dispose of the same and also to promote the flow of gas.

3. The method of treating sewage and impure liquids which comprises settling the heavier sludge in a sludge chamber, flowing the lighter sludge and scum upward to a separate chamber sealed against admission of air, creating a vacuum in the separate chamber effective upon the liquid therein, whereby gases are induced to flow upward from the sludge chamber into the separate chamber, thus being deflected from the path of the influent and whereby sedimentation is increased, and agitating the scum in the separate chamber to promote the flow of the gas.

4. In a sewage disposal plant, a purification tank including a sludge chamber at its bottom, a settling compartment in the tank above the sludge chamber, a scum chamber within the tank sealed against the admission of air and having its bottom open beneath the liquid level in the sludge chamber, means for sucking out the gases from the top of the scum chamber, and a conductor for carrying off the lighter sludge and scum from the scum chamber.

5. In a sewage disposal plant, a purification tank including a sludge chamber at its bottom, a settling compartment in the tank above the sludge chamber, a scum chamber within the tank sealed against the admission of air and having its bottom open beneath the liquid level in the sludge chamber, means for sucking out the gases from the top of the scum chamber, a conductor for carrying off the lighter sludge and scum from the scum chamber, and means for mechanically agitating the scum in the scum chamber.

6. In a sewage disposal plant, a purification tank including a sludge chamber at its bottom, a settling compartment in the tank above the sludge chamber, a scum chamber at one side of the settling compartment sealed against the admission of air and having its bottom open beneath the liquid level in the sludge chamber, a septum separating the settling compartment and the sludge chamber, and means for constantly sucking gas from the top of the scum chamber, whereby a constant flow of gas passes from the sludge chamber to the scum chamber, said gas being diverted from the path of the settling particles by the septum.

7. In a sewage disposal plant, a purification tank including a sludge chamber at its bottom, a settling compartment in the tank above the sludge chamber, a scum chamber at one side of the settling compartment sealed against the admission of air and having its bottom open beneath the liquid level in the sludge chamber, a septum separating the settling compartment and the sludge chamber, means for constantly sucking gas from the top of the scum chamber, whereby a constant flow of gas passes from the sludge chamber to the scum chamber, said gas being diverted from the path of the settling particles by the septum, and a conductor leading from the scum chamber and including a gas trap for carrying off the scum and light sludge without breaking the gas suction.

8. In a sewage disposal plant, a purification tank including a sludge chamber at its bottom, a settling compartment in the tank above the sludge chamber, a scum chamber at one side of the settling compartment sealed against the admission of air and having its bottom open beneath the liquid level in the sludge chamber, a septum separating the settling compartment and the sludge chamber, means for constantly sucking gas from the top of the scum chamber, whereby a constant flow of gas passes from the sludge chamber to the scum chamber, said gas being diverted from the path of the settling particles by the septum, a conductor leading from the scum chamber and including a gas trap for carrying off the scum and light sludge without breaking the gas suction, and a vertically adjustable rotatable agitator in the scum chamber.

9. In a sewage disposal plant, a purification tank including a sludge chamber at its bottom, a settling compartment in the tank above the sludge chamber, a scum chamber at one side of the settling compartment sealed against the admission of air and having its bottom open beneath the liquid level in the sludge chamber, a septum separating the settling compartment and the sludge chamber, means for constantly sucking gas from the top of the scum chamber, whereby a constant flow of gas passes from the sludge chamber to the scum chamber, said gas being diverted from the path of the settling particles by the septum, an elbow having a funnel at its upper end disposed below the liquid level in the scum chamber, and a pipe leading from the elbow and including a valve and a gas trap.

10. In a sewage disposal plant, a purification tank including a sludge chamber at its bottom, a settling compartment in the tank above the sludge chamber, a scum chamber at one side of the settling compartment sealed against the admission of air and having its bottom open beneath the liquid level in the sludge chamber, a septum separating the settling compartment and the sludge chamber, means for constantly sucking gas from the top of the scum chamber, whereby a constant flow of gas passes from the sludge chamber to the scum chamber, said gas being diverted from the path of the settling particles by the septum, an elbow having a funnel at its upper end disposed below the liquid level in the scum chamber, a pipe leading from the elbow and including a valve and a gas trap, a cover over the top of the sum chamber having an air-tight connection therewith, and a gas suction pipe extending through the cover into the chamber and terminating above the liquid level therein.

11. The method of treating sewage and impure liquids which comprises settling the heavier sludge in a suitable tank, flowing the lighter sludge and scum upwardly into a chamber sealed against the admission of air and creating a vacuum above the liquid level, whereby gases are induced to flow upward from the settling sludge and are carried off from above the liquid level, and also deflecting the upwardly moving gases from the path of the influent whereby sedimentation is increased.

12. The method of treating sewage and impure liquids which comprises settling the heavier sludge in a tank, flowing the lighter sludge and scum upwardly, withdrawing the gases from above the liquid level by creating a vacuum, and controlling said withdrawal by the level of the liquid in the dosing tank of the plant.

THOMAS BANKS SIMS.